United States Patent
Chiu et al.

(10) Patent No.: US 8,462,127 B2
(45) Date of Patent: Jun. 11, 2013

(54) TOUCH SCREEN AND METHOD FOR POSITIONING COORDINATE

(75) Inventors: Yen-Chen Chiu, Hsin-Chu (TW); Ming Chieh Hsi, Hsin-Chu (TW)

(73) Assignee: Elan Microelectronics Corp., Hsin-Chu (TW)

( * ) Notice: Subject to any disclaimer, the term of this patent is extended or adjusted under 35 U.S.C. 154(b) by 840 days.

(21) Appl. No.: 12/534,395

(22) Filed: Aug. 3, 2009

(65) Prior Publication Data

US 2010/0033449 A1  Feb. 11, 2010

(30) Foreign Application Priority Data

Aug. 5, 2008 (TW) ................................ 97129599 A

(51) Int. Cl.
*G06F 3/041* (2006.01)

(52) U.S. Cl.
USPC .......................................................... 345/173

(58) Field of Classification Search
USPC ..................... 345/173–174; 178/18.01–18.03, 178/18.06
See application file for complete search history.

(56) References Cited

U.S. PATENT DOCUMENTS

| | | | | |
|---|---|---|---|---|
| 5,463,388 A * | 10/1995 | Boie et al. | ......................... | 341/33 |
| 5,825,352 A * | 10/1998 | Bisset et al. | .................. | 345/173 |
| 2002/0093491 A1 * | 7/2002 | Gillespie et al. | .............. | 345/173 |
| 2005/0041018 A1 * | 2/2005 | Philipp | ......................... | 345/178 |
| 2006/0279551 A1 * | 12/2006 | Lii et al. | ......................... | 345/173 |
| 2007/0008299 A1 * | 1/2007 | Hristov | .......................... | 345/173 |
| 2007/0074913 A1 * | 4/2007 | Geaghan et al. | ........... | 178/18.06 |
| 2007/0284154 A1 * | 12/2007 | Li et al. | ....................... | 178/18.03 |
| 2009/0189866 A1 * | 7/2009 | Haffenden et al. | ........... | 345/173 |

* cited by examiner

*Primary Examiner* — Chanh Nguyen
*Assistant Examiner* — Pegeman Karimi
(74) *Attorney, Agent, or Firm* — Muncy, Geissler, Olds & Lowe, PLLC

(57) ABSTRACT

The present invention relates to a touch screen and a method for positioning a coordinate. The touch screen includes a sensor array layer and a microprocessor. The sensor array layer includes M×N capacitive sensors, wherein M rows of the capacitive sensors are disposed along a first axis, and N columns of the capacitive sensors are disposed along a second axis. The microprocessor includes a plurality of pins correspondingly coupled to the capacitive sensors. When the touch screen is touched to change at least one of sensing values of the capacitive sensors in the sensor array layer, the microprocessor performs an interpolation calculation to determine a touched coordinate according to the sensing values sensed by the capacitive sensors.

20 Claims, 14 Drawing Sheets

TOUCH SCREEN AND METHOD FOR POSITIONING COORDINATE

This application claims priority of No. 097129599 filed in Taiwan R.O.C. on Aug. 5, 2008 under 35 USC 119, the entire content of which is hereby incorporated by reference.

BACKGROUND OF THE INVENTION

1. Field of the Invention

The present invention relates to the touch-control technology, and more particularly to a touch screen and a coordinate positioning method.

2. Related Art

Recently, due to the rapid development of the technology, handheld devices, such as a smart mobile phone, a digital personal assistant (PDA), a global position system (GPS) and the like, have become more and more popular. Because touch screens are used in the above-mentioned devices, the technology of the touch sensor becomes very important. In the prior art, the typically used touch sensor is a resistive sensor. This resistive sensor has to sense the coordinate on the screen according to the pressure. A liquid crystal display is usually used in the handheld device, and the resistive sensor further has to be overlapped with the liquid crystal display. So, when the liquid crystal display presses the resistive sensor, the liquid crystal display is correspondingly pressed. After a long period of time, the liquid crystal display may be thus damaged. In addition, the resistive sensor has the lower resolution, and the coordinate often cannot be positioned precisely.

In the prior art, another touch sensor corresponding to a capacitive touch panel is also adopted. At present, the capacitive touch panel is widely applied to the touch screen of the handheld device. However, four layout layers have to be adopted in the circuit layout of the touch board of the conventional capacitive touch panel. FIG. 1 is a cross-sectional view showing a structure of a conventional capacitive touch panel. Referring to FIG. 1, the capacitive touch panel includes a Y-axis sensing layer 101, an X-axis sensing layer 102, a grounding layer 103 and an electronic component layer 104, wherein electric elements, including control ICs, resistors, capacitors, and the like, connected together may be disposed on the electronic component layer 104. FIGS. 2 and 3 respectively show the structures of the Y-axis sensing layer 101 and the X-axis sensing layer 102 of the conventional capacitive touch panel. Referring to FIGS. 2 and 3, the Y-axis sensing layer 101 and the X-axis sensing layer 102 respectively include multiple parallel sensing electrodes X00 and Y00.

In addition, the conventional capacitive touch panel further has still another structure, such as an indium tin oxide (ITO) glass structure with six layers. FIG. 4 is a cross-sectional view showing a conventional capacitive touch panel with the indium tin oxide (ITO) glass structure. Referring to FIG. 4, the first layer 401 is a silicon dioxide ($SiO_2$) layer for protecting a Y-axis sensing layer. The second layer 402 is the Y-axis sensing layer. The third layer 403 is a glass layer. The fourth layer 404 is an X-axis sensing layer. The fifth layer 405 is a silicon dioxide layer for protecting the X-axis sensing layer. The sixth layer 406 is a noise shielding layer for shielding the noise.

However, the printed circuit board or the indium tin oxide (ITO) glass structure has to be configured into a two-dimensional plane so that the conventional capacitive touch panel may be applied to the sensing over the two-dimensional plane. Thus, the manufacturing procedure is complicated, and the cost requirement also becomes higher.

SUMMARY OF THE INVENTION

In view of this, it is therefore an objective of the present invention to provide a coordinate positioning method and a touch screen using the same, wherein two-dimensional plane coordinates are obtained by way of one-dimensional sensing. Thus, the sensing resolution is increased, and the manufacturing cost of a printed circuit board or an indium tin oxide (ITO) glass is lowered.

Another objective of the present invention is to provide a coordinate calibrating method of a touch screen for transferring coordinates of capacitive sensors into coordinates of a display panel.

The present invention achieves the above-identified or other objectives by providing a touch screen including a sensor array layer and a microprocessor. The sensor array layer includes M×N capacitive sensors, wherein M rows of the capacitive sensors are disposed along a first axis, and N columns of the capacitive sensors are disposed along a second axis. The microprocessor includes multiple pins correspondingly coupled to the capacitive sensors. When the touch screen is touched to change at least one of sensing values of the capacitive sensors in the sensor array layer, the microprocessor performs an interpolation calculation to determine a touched coordinate according to the sensing values sensed by the capacitive sensors.

In addition, the present invention provides a coordinate positioning method. The method includes the steps of: providing a touch screen; providing a sensor array layer, comprising M×N capacitive sensors, in the touch screen, wherein M rows of the capacitive sensors are disposed along a first axis, and N columns of the capacitive sensors are disposed along a second axis; providing a plurality of reference coordinates, each comprising a first axial coordinate and a second axial coordinate, to the capacitive sensors; and determining, when the touch screen is touched to change at least one of sensing values of the capacitive sensors in the sensor array layer, a touched coordinate by performing an interpolation calculation according to the sensing values sensed by the capacitive sensors and the first axial coordinate and the second axial coordinate of the corresponding reference coordinate.

The touch screen according to the preferred embodiment of the present invention, the touch screen further includes an electronic component layer and a grounding layer, wherein the grounding layer is disposed between the sensor array layer and the electronic component layer. In another embodiment, the touch screen further includes a first silicon oxide layer and a second silicon oxide layer, wherein the sensor array layer is disposed between the first silicon oxide layer and the second silicon oxide layer.

The spirit of the present invention is to provide a sensor array layer in a touch panel, wherein the sensor array layer has M×N capacitive sensors, M rows of the capacitive sensors are disposed along the first axis, N columns of the capacitive sensors are disposed along the second axis, and each capacitive sensor is coupled to a microprocessor. Thus, when the touch panel is touched, the sensing value of the capacitive sensor located at the corresponding position is changed, and the touched position may be obtained by way of calculation. Because the structure is obviously different from the conventional touch panel, the present invention only needs one sensing layer to perform the coordinate positioning, which has to be achieved in the prior art using two sensing layers. Thus, the sensing resolution is increased, and the manufacturing cost of the printed circuit board or the indium tin oxide (ITO) glass may be further reduced as compared with the prior art.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
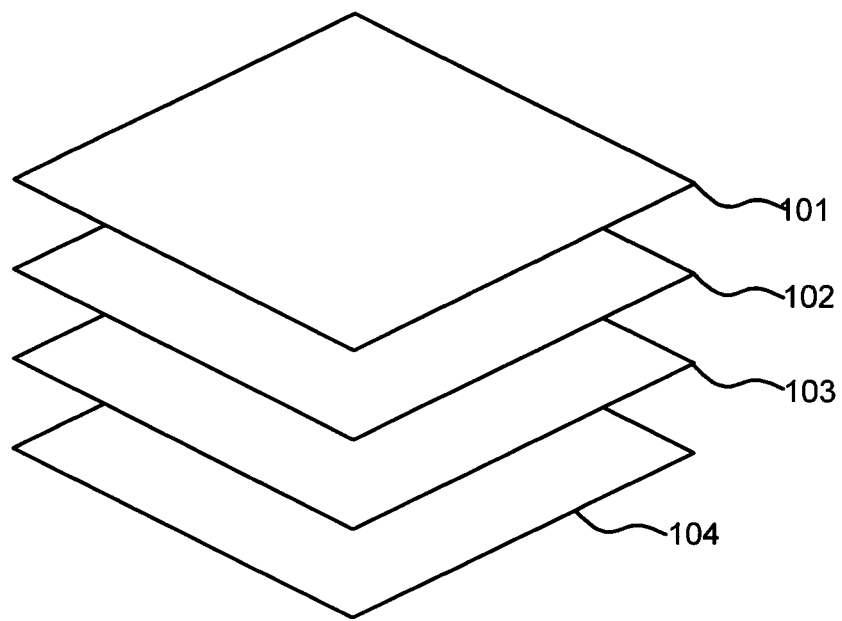
FIG. 1 is a cross-sectional view showing a structure of a conventional capacitive touch panel.
Figure 2:
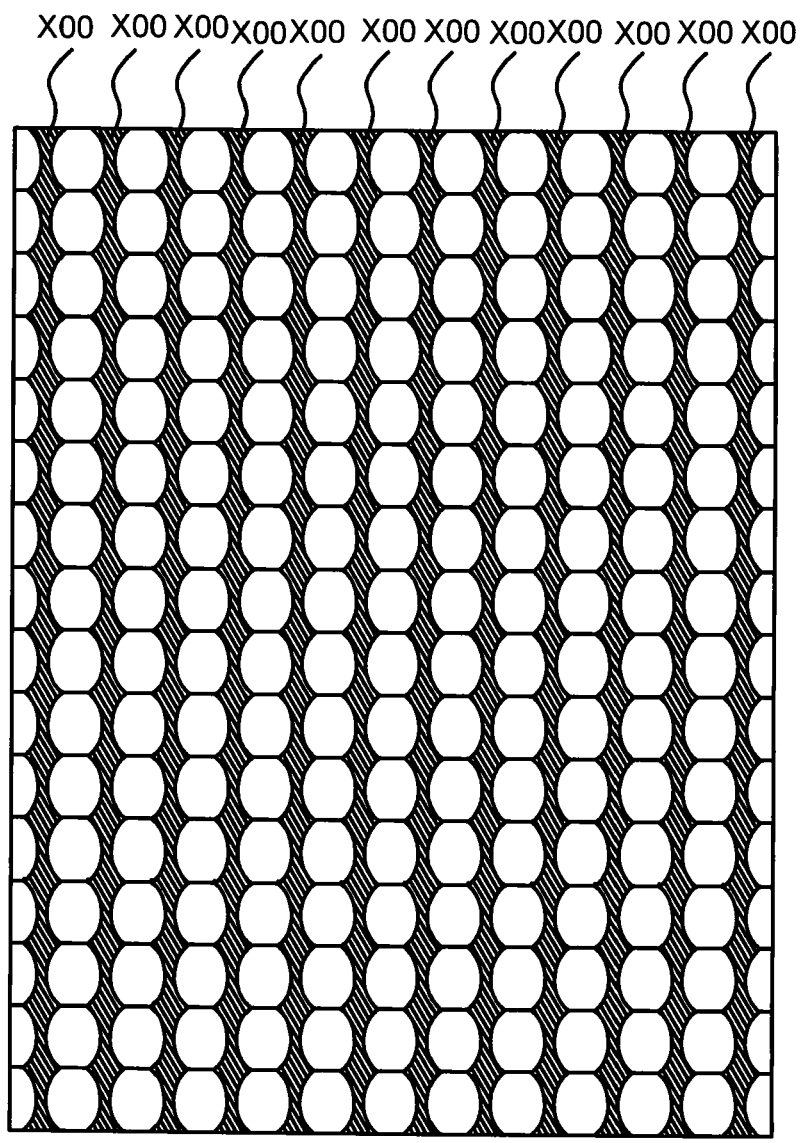
FIG. 2 shows the structure of a Y-axis sensing layer 101 of the conventional capacitive touch panel.
Figure 3:
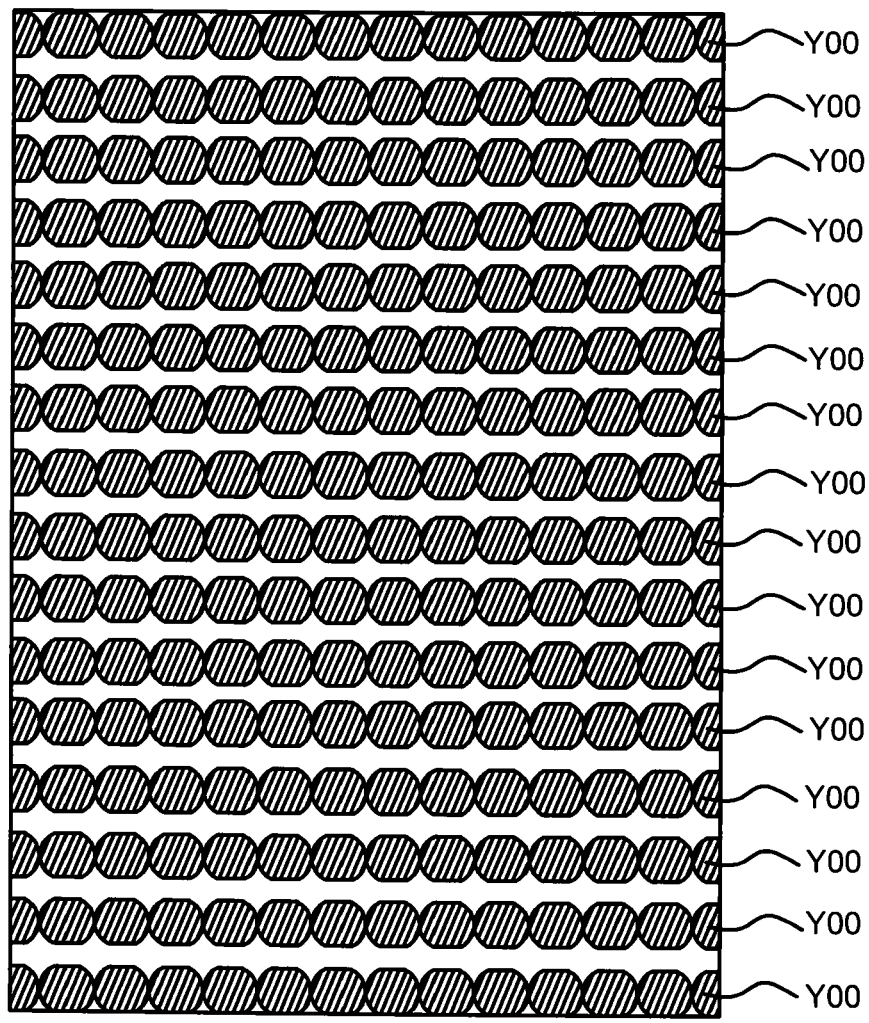
FIG. 3 shows the structure of an X-axis sensing layer 102 of the conventional capacitive touch panel.
Figure 4:
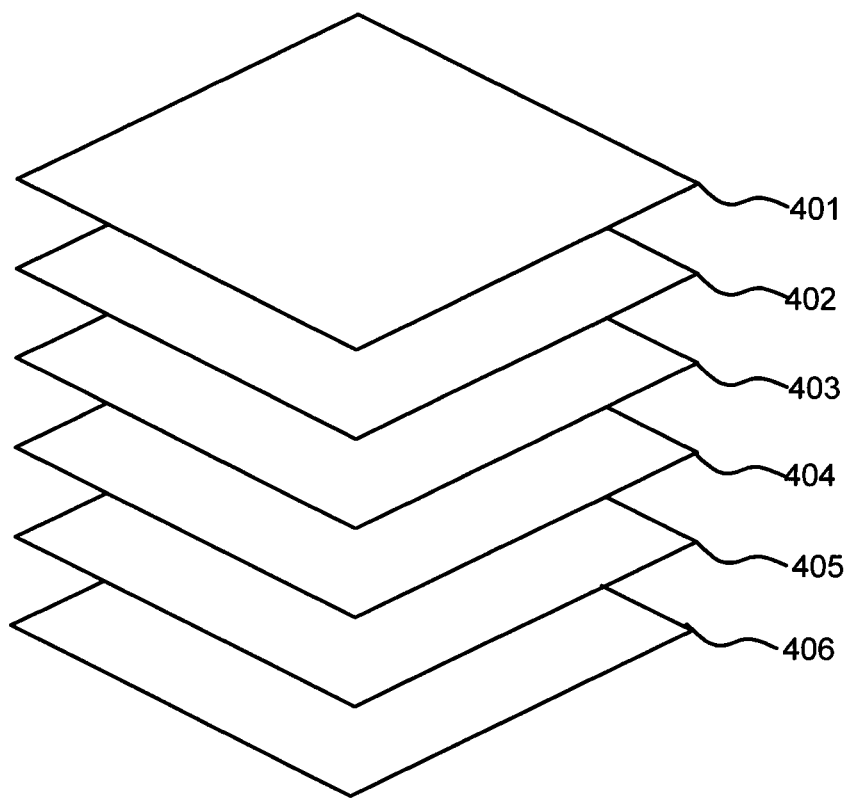
FIG. 4 is a cross-sectional view showing a conventional capacitive touch panel with an indium tin oxide (ITO) glass structure.
Figure 5:
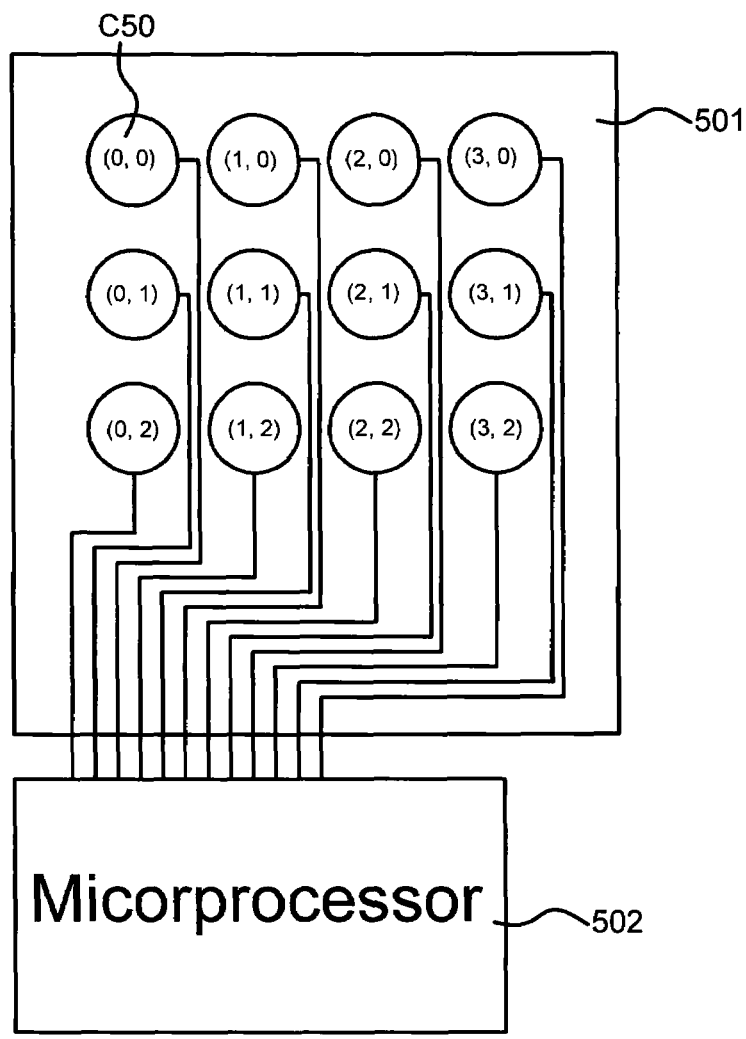
FIG. 5 shows the circuit structure of a touch screen according to an embodiment of the present invention.

FIG. 5 shows the circuit structure of a touch screen according to an embodiment of the present invention. Referring to FIG. 5, the capacitive touch screen includes a sensor array layer 501 and a microprocessor 502. In this embodiment, the sensor array layer 501 includes 12 capacitive sensors 50 arranged in a 3×4 array. Each capacitive sensor 50 is coupled to the microprocessor 502. The capacitive sensors 50 respectively have representative coordinates (0, 0) to (4, 3).

When the finger of the human body or any conductive material does not contact with the capacitive touch screen, the capacitance of the capacitive sensor 50 is kept unchanged. Therefore, each capacitor sensing value received by the microprocessor 502 does not fluctuate. Generally speaking, the microprocessor 502 provides an initial value (BaseValue), which is typically equal to 0, to each corresponding capacitive sensor 50. When the finger or any conductive material contacts with the capacitive touch screen of this embodiment, the capacitor sensing values (ADCValue) corresponding to some of the contacted capacitive sensors 50 or the neighboring capacitive sensors 50 change, and the microprocessor 502 performs the following judgement:

(ADCValue−BaseValue)>Th, wherein Th represents a threshold value.

When the value is judged as being greater than the threshold value, the microprocessor 502 judges that the finger or any conductive material has contacted with the capacitive sensor 50.

Figure 6:
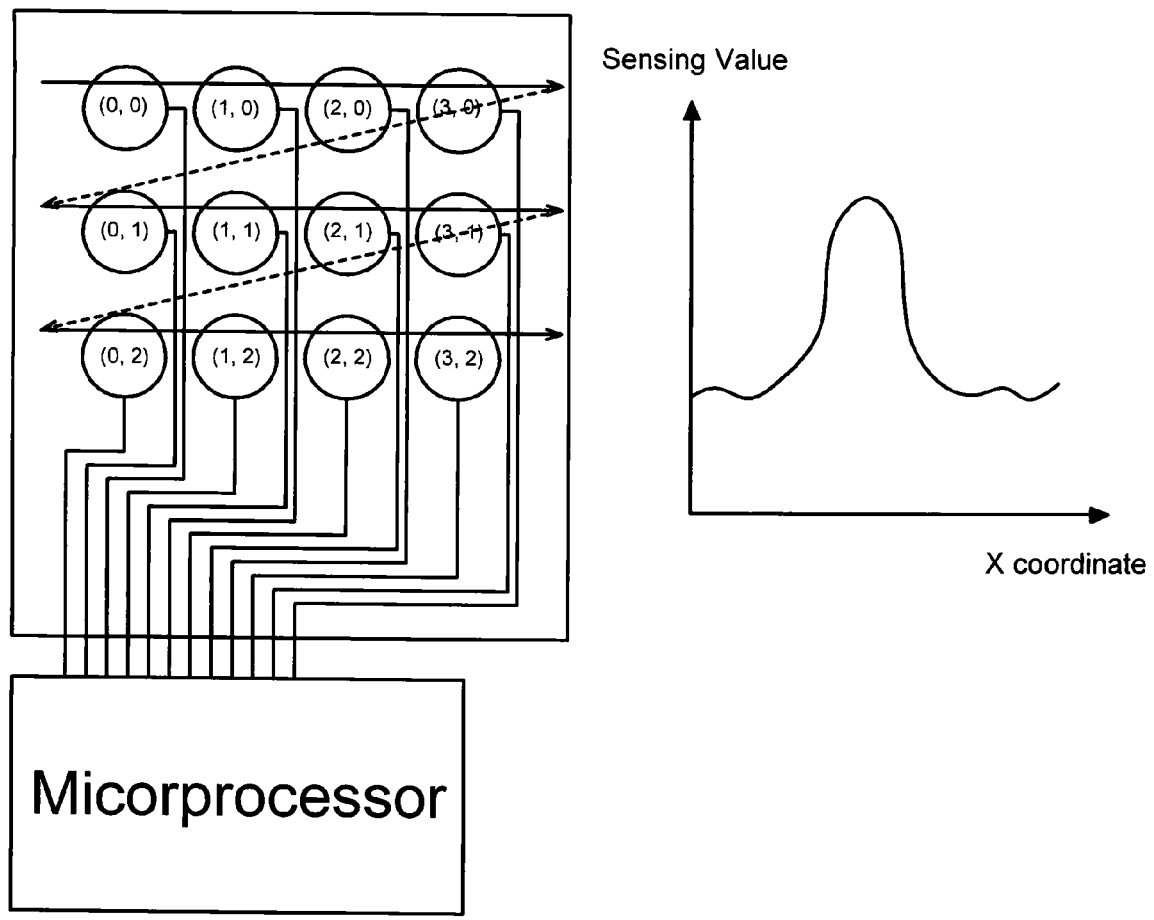
FIG. 6 is a schematic illustration showing a method of judging a coordinate along the X-axis direction in the capacitive touch screen according to the embodiment of the present invention.

FIG. 6 is a schematic illustration showing a method of judging a coordinate along the X-axis direction in the capacitive touch screen according to the embodiment of the present invention. As shown in FIG. 6 of this embodiment, when the X-axis coordinate is to be determined, the microprocessor 502 scans the capacitor sensing values corresponding to the capacitive sensors 50 according to the following order:
(0, 0)→(1, 0)→(2, 0)→(3, 0)→(0, 1)→(1, 1)→(2, 1)→(3, 1) . . . →→(4, 3).

When it is judged that the capacitor sensing values corresponding to two neighboring capacitive sensors 50 are greater than the threshold value, an interpolation calculation is performed to obtain the touched coordinate of the object (e.g., the conductor or the finger). The interpolation calculation is listed in the following:

$$X\_position = \frac{K \times i + L \times (i+1)}{K+L} \times S$$

wherein X_position represents the judged X coordinate, i and i+1 respectively represent X coordinates of the neighboring capacitive sensors 50, K represents the capacitor sensing value sensed at the $i^{th}$ X coordinate, L is the capacitor sensing value sensed at the $(i+1)^{th}$ X coordinate, and S is a coordinate interval number (or a difference) between two X coordinates.

For example, it is assumed that the built-in coordinate interval number of the X coordinate is 32 in each capacitive sensor 50 of the capacitive touch screen. When the finger touches the portion between the capacitive sensors 50 located at the coordinates (1, 0) and (2, 0), the capacitor sensing value sensed by the capacitive sensor 50 located at the coordinate (1, 0) is 70, and the capacitor sensing value sensed by the capacitive sensor 50 located at the coordinate (2, 0) is 80. That is, the X coordinate is:

(70×1+80×2)×32÷(70+80)=49.067≈49.

Figure 7:
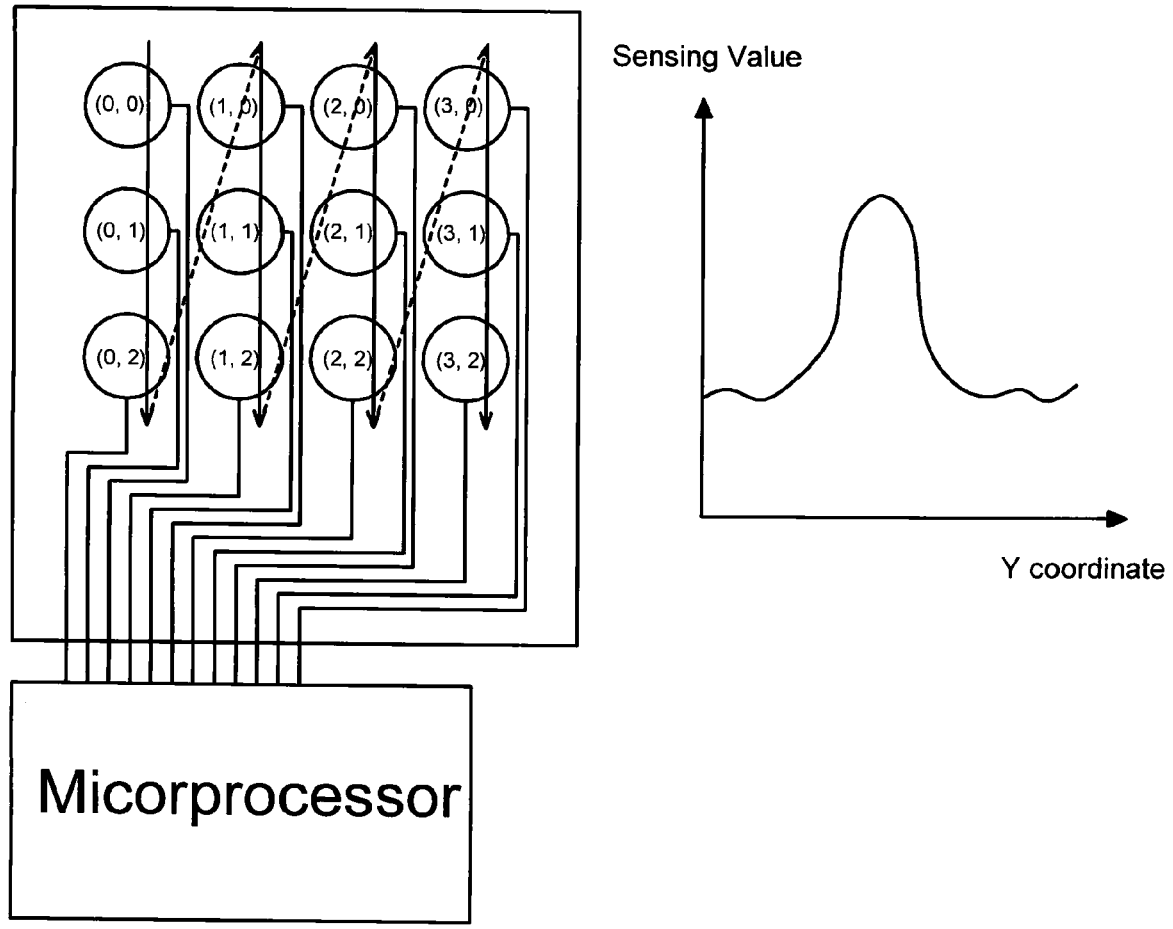
FIG. 7 is a schematic illustration showing a method of judging a coordinate along the Y-axis direction in the capacitive touch screen according to the embodiment of the present invention.

FIG. 7 is a schematic illustration showing a method of judging a coordinate along the Y-axis direction in the capacitive touch screen according to the embodiment of the present invention. Similarly, as shown in FIG. 7 of this embodiment, when the Y-axis coordinate is to be determined, the microprocessor 502 scans the capacitor sensing values corresponding to the capacitive sensors 50 according to the following order:

(0, 0)=(0, 1)→(0, 2)→(1, 0)→(1, 1)→(1, 2)→(2, 0)→(2, 1) . . . →→(4, 3).

When it is judged that the capacitor sensing values corresponding to two neighboring capacitive sensors 50 are greater than the threshold value, the interpolation calculation is performed to obtain the touched coordinate of the object (e.g., the conductor or the finger). The interpolation calculation is listed in the following:

$$Y\_position = \frac{K \times j + L \times (j+1)}{K + L} \times S$$

wherein Y_position represents the judged Y coordinate, j and j+1 respectively represent Y coordinates of the neighboring capacitive sensors 50, K represents the capacitor sensing value sensed at the $j^{th}$ Y coordinate, L is the capacitor sensing value sensed at the (j+1)th Y coordinate, and S is a coordinate interval number (or a difference) between two coordinates.

For example, it is assumed that the built-in coordinate interval number of the Y coordinate is 40 in each capacitive sensor 50 of the capacitive touch screen. When the finger touches the portion between the capacitive sensors 50 located at the coordinates (1, 1) and (1, 2), the capacitor sensing value sensed by the capacitive sensor 50 located at the coordinate (1, 1) is 90, and the capacitor sensing value sensed by the capacitive sensor 50 located at the coordinate (1, 2) is 150. That is, the Y coordinate is:

Y_position=(90×1+150×2)×40÷(90+150)=65.

Figure 8:
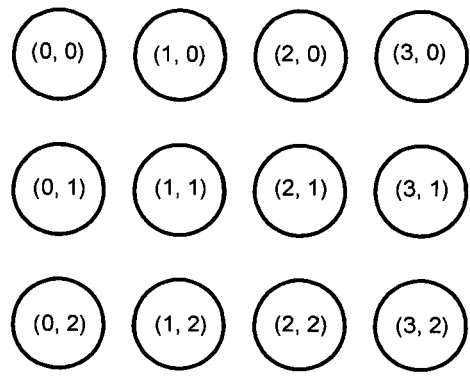
FIG. 8 shows one coordinate allocation of the capacitive touch screen according to the embodiment of the present invention.
Figure 8:
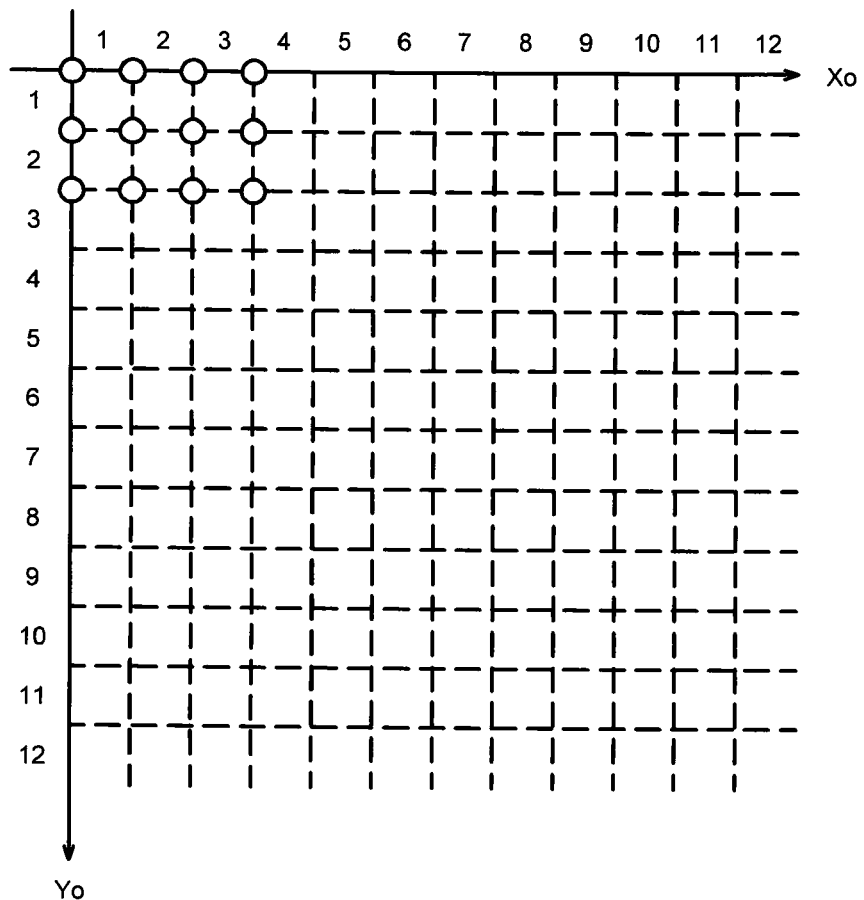
Figure 9:
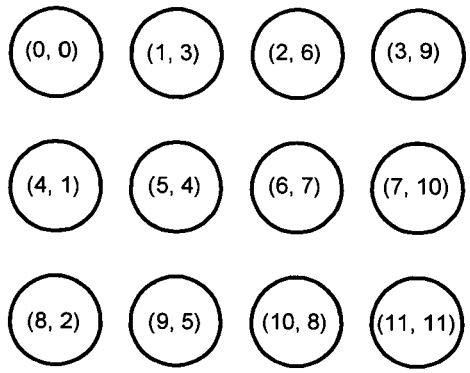
FIG. 9 shows another coordinate allocation of the capacitive touch screen according to the embodiment of the present invention.
Figure 9:
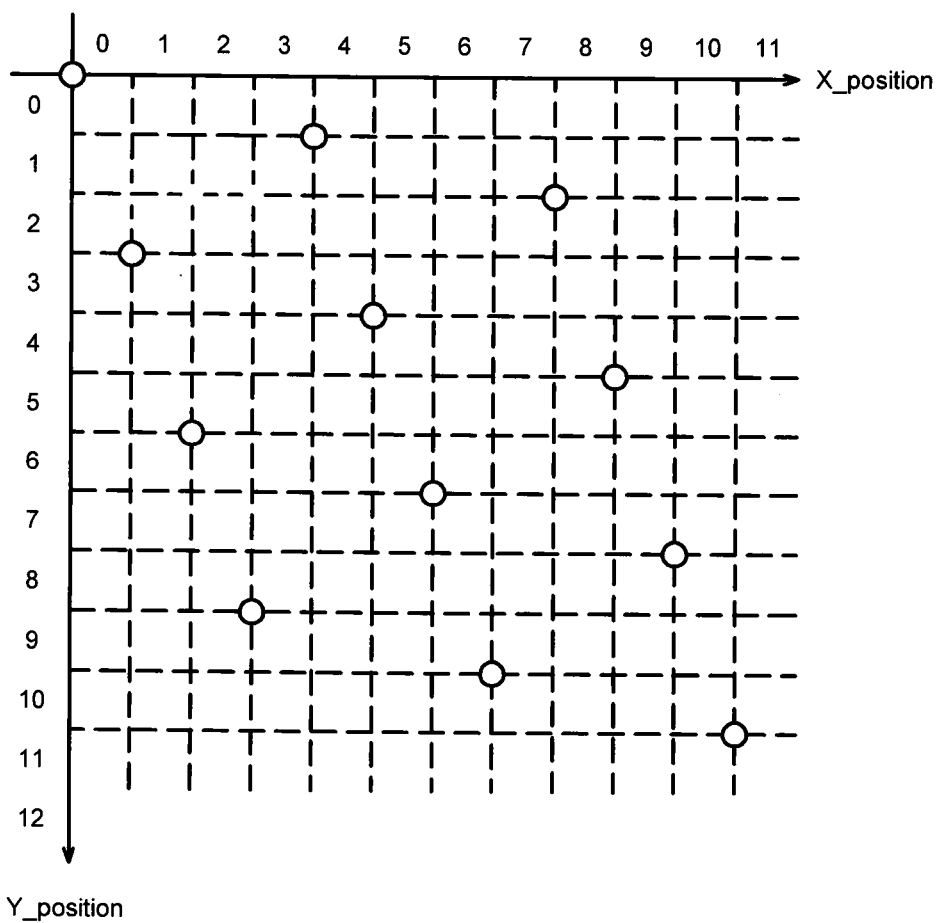

FIG. 8 shows one coordinate allocation of the capacitive touch screen according to the embodiment of the present invention. FIG. 9 shows another coordinate allocation of the capacitive touch screen according to the embodiment of the present invention. Please refer simultaneously to FIGS. 8 and 9, wherein FIG. 8 shows one standard coordinate allocation of the above-mentioned embodiment, and FIG. 9 shows another standard coordinate allocation. Generally speaking, according to the customer's requirement or different coding methods of the firmware, the coordinate allocation may be changed, as mentioned hereinabove. If the coordinate allocation of FIG. 9 is to be changed to the coordinate allocation of FIG. 8, a coordinate transferring calculation has to be performed by the microprocessor 502.

The following assumptions are made before the coordinate transferring calculation is described. It is assumed that the symbols of the X coordinate and the Y coordinate of FIG. 9 are respectively X_position and Y_position, and the symbols of the X coordinate and the Y coordinate of FIG. 8 are respectively Xo and Yo, wherein m and n respectively represent the column number and the row number of the capacitive sensor 50. Under this assumption, the following equations may be obtained:

$$\begin{cases} X\_position = Xo + n*Yo \\ Y\_position = m*Xo + Yo \end{cases}$$

The simultaneous equations may be expressed in the form of a matrix:

$$\begin{bmatrix} X\_position \\ Y\_position \end{bmatrix} = \begin{bmatrix} 1 & n \\ m & 1 \end{bmatrix} \begin{bmatrix} Xo \\ Yo \end{bmatrix}$$

Therefore, a two-dimensional coordinate (Xo, Yo) is mapped and obtained by an inverse matrix operation:

$$\begin{bmatrix} Xo \\ Yo \end{bmatrix} = \begin{bmatrix} 1 & n \\ m & 1 \end{bmatrix}^{-1} \begin{bmatrix} X\_position \\ Y\_position \end{bmatrix}$$

$$= \frac{1}{(1-m*n)} \begin{bmatrix} 1 & -n \\ -m & 1 \end{bmatrix} \begin{bmatrix} X\_position \\ Y\_position \end{bmatrix}$$

$$\Rightarrow \begin{cases} Xo = \dfrac{-X\_position + n*Y\_position}{(m*n) - 1} \\ Yo = \dfrac{m*X\_position - Y\_position}{(m*n) - 1} \end{cases}$$

Figure 10:
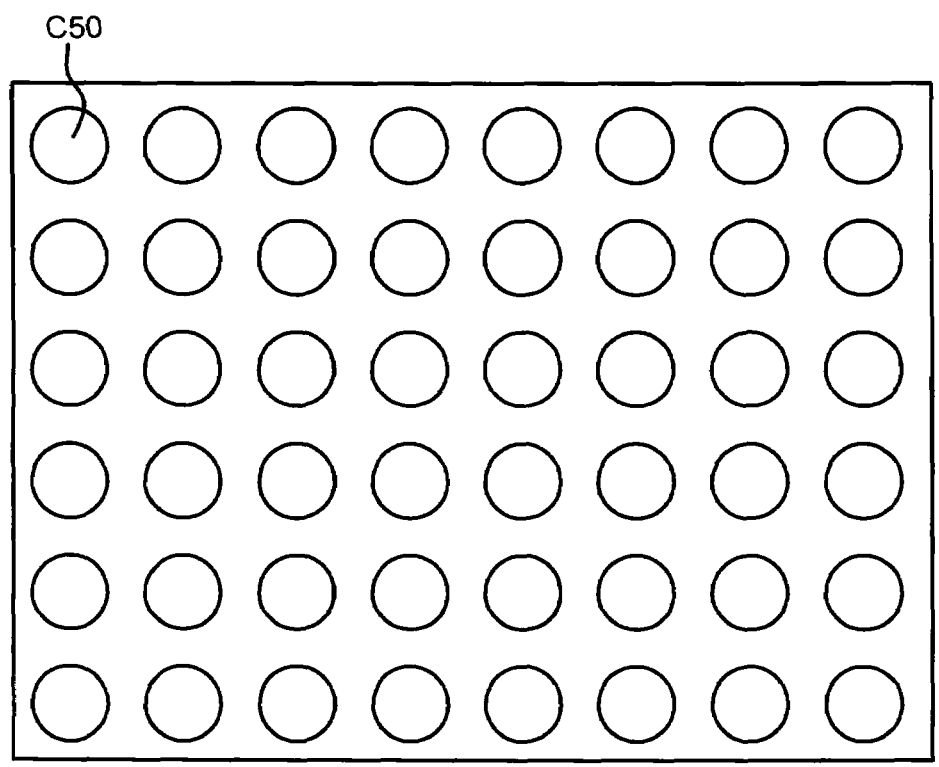
FIG. 10 shows the structure of the capacitive touch screen according to the embodiment of the present invention.
Figure 11:
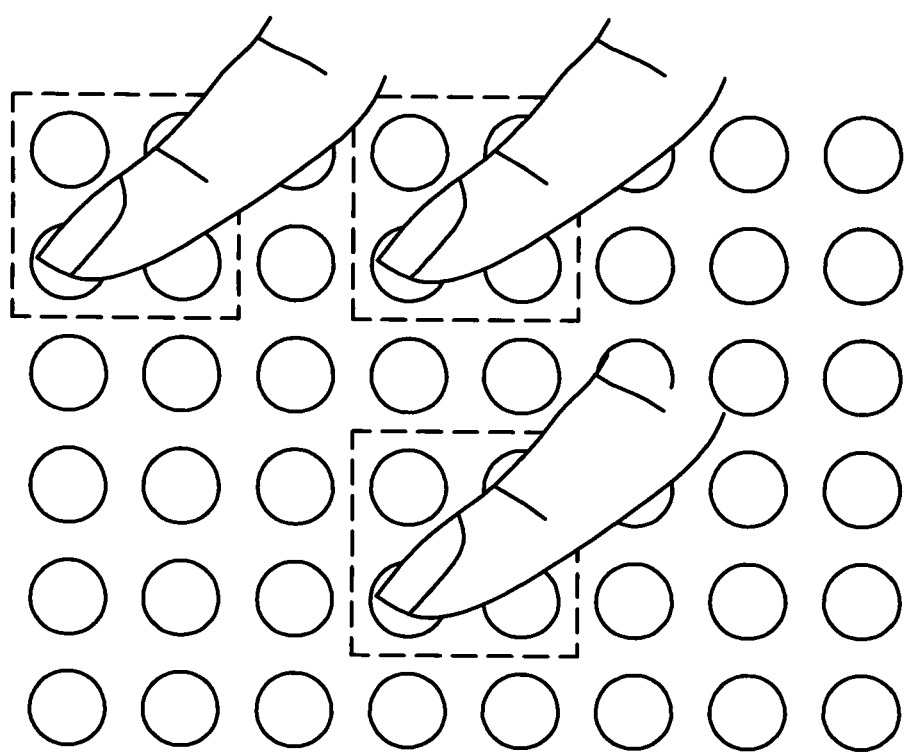
FIG. 11 is a schematic illustration showing a contact sensing method for multiple fingers or conductive materials according to the embodiment of the present invention.

FIG. 10 shows the structure of the capacitive touch screen according to the embodiment of the present invention. As shown in FIG. 10, the touch screen with 12 capacitive sensors 50 is illustrated as an example. However, one of ordinary skill in the art should understand that the resolution becomes higher and the acquired and the calculated coordinate gets more precise as the number of the capacitive sensors 50 gets higher. In addition, FIG. 11 is a schematic illustration showing a contact sensing method for multiple fingers or conductive materials according to the embodiment of the present invention. As shown in FIG. 11, it is defined that four neighboring capacitive sensors 50 including the capacitive sensor(s) touched by a single finger of the user are regarded as a group in this embodiment. According to the above-mentioned flow, the interpolated displacement point may be obtained by moving the finger or any conductive material between two capacitive sensors.

Figure 12:
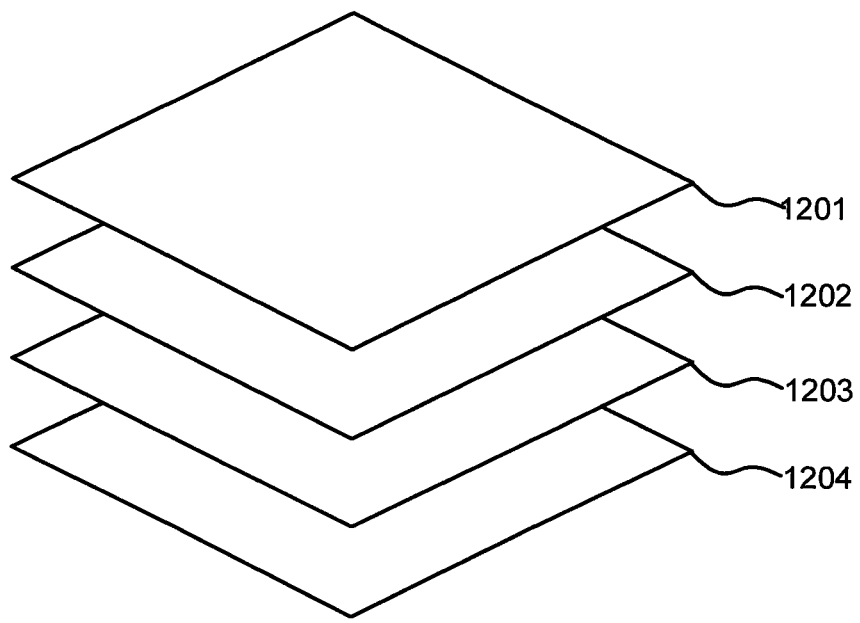
FIG. 12 is a cross-sectional view showing the structure of the capacitive touch screen according to the embodiment of the present invention.

According to the above-mentioned embodiments, it is obtained that the present invention only needs one sensor array layer to achieve the two-dimensional coordinate positioning, which only can be achieved using two sensing layers in the prior art. FIG. 12 is a cross-sectional view showing the structure of the capacitive touch screen according to the embodiment of the present invention. As shown in FIG. 12, if the method of the present invention is implemented in the method of manufacturing the touch screen of a printed circuit board, only the three-layer structure including first to third layers 1201 to 1203 is needed. The first layer 1201 is the sensor array layer according to the embodiment of the present invention. The second layer 1202 is a grounding layer. The third layer 1203 is an electronic component layer. Similarly, if the method of the present invention is implemented in the process of manufacturing a touch screen with the indium tin oxide (ITO), only the four-layer structure is needed. The first layer 1201 is the silicon dioxide layer. The second layer 1202 is the sensor array layer according to the embodiment of the present invention. The third layer 1203 is a glass layer. The fourth layer 1204 is a noise shielding layer.

Figure 13:
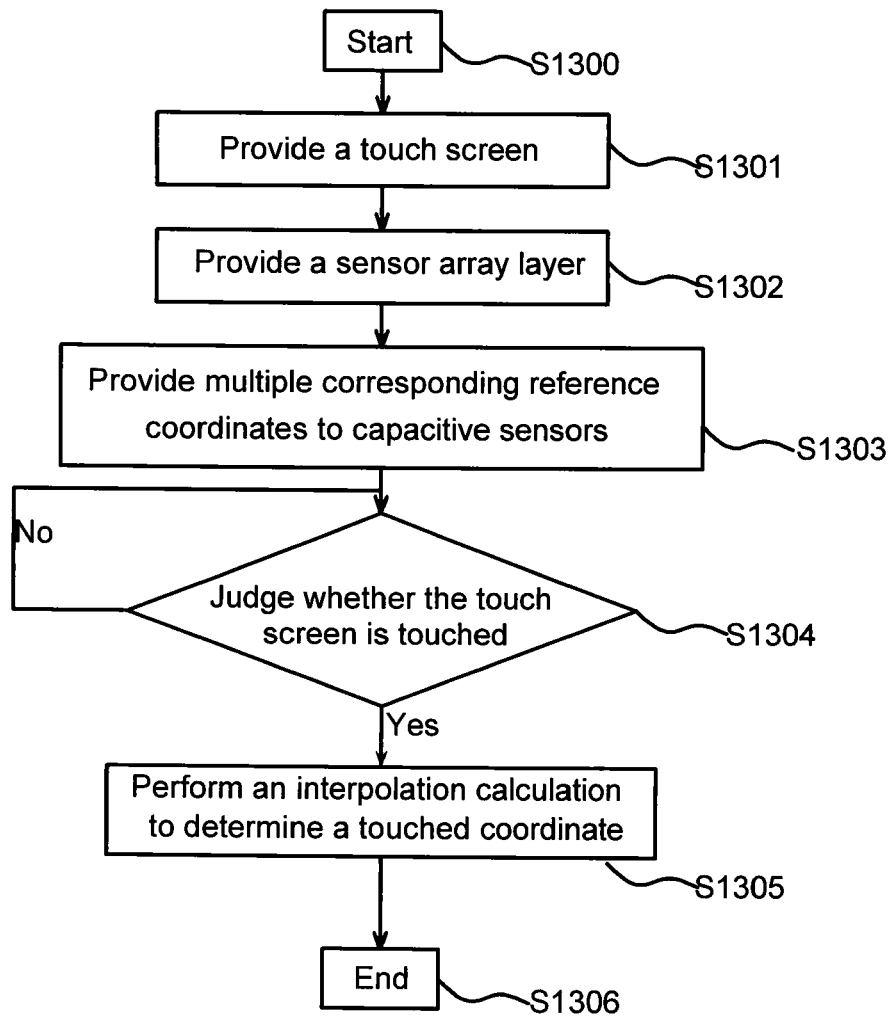
FIG. 13 is a flow chart showing a coordinate positioning method according to the embodiment of the present invention.

A coordinate positioning method may be simply concluded according to the embodiment of the present invention. FIG. 13 is a flow chart showing a coordinate positioning method according to the embodiment of the present invention. Referring to FIG. 13, the method includes the following steps.

In step S1300, the method starts.

In step S1301, a touch screen is provided.

In step S1302, a sensor array layer, which includes M×N capacitive sensors, is provided in the touch screen, wherein M rows of the capacitive sensors are disposed along a first axis, and N columns of the capacitive sensors are disposed along a second axis.

In step S1303, multiple corresponding reference coordinates are provided to the capacitive sensors. Each reference coordinate includes a first axial coordinate and a second axial coordinate, as shown in the coordinate system of FIG. 8 or 9, for example.

In step S1304, it is judged whether the touch screen is touched or not by the microprocessor 502 according to whether the capacitor sensing value of the capacitive sensor 50 is greater than the threshold value, for example, when the judged result is negative, the procedure goes back to step S1304 to perform the continuous judgement.

In step S1305, when the touch screen is touched to change at least one of sensing values of the capacitive sensors in the sensor array layer, an interpolation calculation is performed to determine a touched coordinate according to the sensing values sensed by the capacitive sensors, and the first axial coordinate and the second axial coordinate of the corresponding reference coordinate. The interpolation calculation has been mentioned in the above-mentioned embodiment, so detailed descriptions thereof will be omitted.

In step S1306, the method ends.

Figure 14:
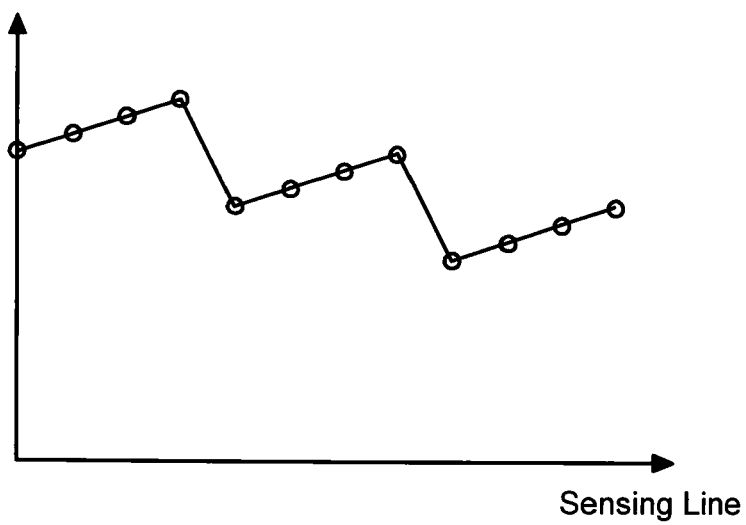
FIG. 14 is a schematic illustration showing the layout impedance of the capacitive touch screen according to the embodiment of the present invention.

FIG. 14 is a schematic illustration showing the layout impedance of the capacitive touch screen according to the embodiment of the present invention. As shown in FIG. 14, three groups of points in FIG. 14 sequentially represent, from left to right, the layout resistance of the sensing lines coupled to the first row of four capacitive sensors 50, the layout resistance of the sensing lines coupled to the second row of four capacitive sensors 50, and the layout resistance of the sensing lines coupled to the third row of four capacitive sensors 50. In the embodiment of the present invention, the architecture, in which the one-dimensional capacitive sensor array is extended into the two-dimensional plane, so each capacitive sensor 50 needs to have a corresponding sensing line to be coupled to the microprocessor 502. When the capacitive sensor 50 is farther from the microprocessor 502, the layout resistance of the sensing line gets larger so that the sensing value sensed by the microprocessor 502 becomes smaller. If the capacitive sensor 50 is nearer to the microprocessor 502, the layout resistance generated by the corresponding sensing line gets smaller so that the sensing value obtained by the microprocessor 502 becomes larger.

Figure 15:
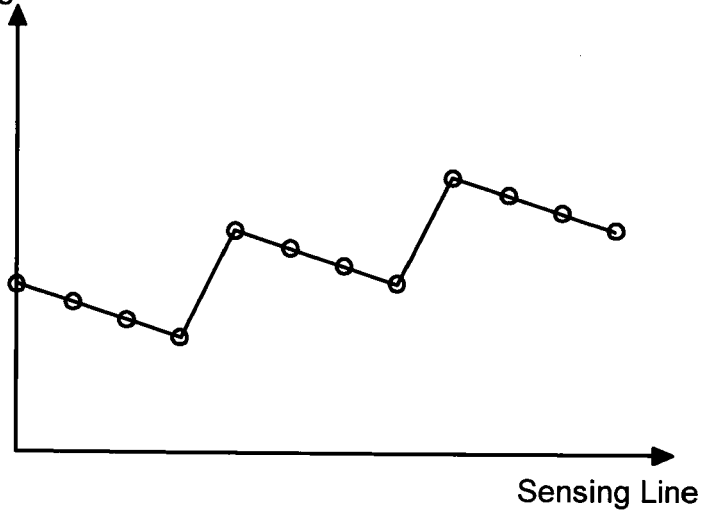
FIG. 15 is a schematic illustration showing sensing values sensed by a capacitive sensor 50 on the capacitive touch screen in the same state according to the embodiment of the present invention.

FIG. 15 is a schematic illustration showing sensing values sensed by the capacitive sensor 50 on the capacitive touch screen in the same state according to the embodiment of the present invention. As shown in FIG. 15, the unequally distributed sensing values are obtained under the condition where the layout resistance lengths are unequally distributed. In order to obtain the good judged performance for judging whether the finger or conductor is placed or approaches the sensing plane, the present invention additionally provides two implementing methods.

First, the gain adjustment is performed on the sensing values sensed by each row of capacitive sensors 50 with one row serving as one unit. For example, if the layout resistance of the sensing line coupled to the $I^{th}$ row of capacitive sensors 50 is smaller than the layout resistance of the sensing line coupled to the $(I+1)^{th}$ row of capacitive sensors 50, then the $I^{th}$ row of sensing values are greater that the $(I+1)^{th}$ row of sensing values. Therefore, the designed microprocessor 502 may make the $(I+1)^{th}$ row of gains be greater than the $I^{th}$ row of gains such that suitable gains may be assigned to the capacitive sensor 50 according to the layout resistance, and the sensing values sensed by the capacitive sensors 50 may be close to one another or each other under the same touch condition.

Second, the threshold value adjustment is performed on the sensing values sensed by each row of capacitive sensors 50 with one row serving as one unit. As mentioned hereinabove, when the finger is placed on a sensing region, the microprocessor 502 obtains a sensing value (ADCVaule). So, when (ADCValue−BaseValue) is greater than the threshold value (Threshold), it is judged that the finger is placed on the sensing region. Therefore, in order to overcome the layout resistance, the microprocessor 502 may be designed with one row serving as one unit to adjust the threshold values (Threshold) corresponding to each row of capacitive sensors 50. For example, if the layout resistance corresponding to the $I^{th}$ row of capacitive sensors 50 is smaller than the layout resistance corresponding to the $(I+1)^{th}$ row of capacitive sensors 50, then the sensing values corresponding to the $I^{th}$ row of capacitive sensors 50 are greater than the sensing values corresponding to the $(I+1)^{th}$ row of capacitive sensors 50. Thus, suitable threshold values may be assigned to the capacitive sensors 50 according to different layout resistances by properly designing the built-in $(I+1)^{th}$ row of threshold values (Threshold I+1) of the microprocessor 502 to be smaller than the $I^{th}$ row of threshold values (Threshold I) such that each row of capacitive sensors 50 may correctly judge whether the finger or the conductor contacts with or approaches to the capacitive sensors 50 or not.

In summary, the spirit of the present invention is to provide a sensor array layer in a touch panel, wherein the sensor array layer has M×N capacitive sensors, M rows of the capacitive sensors are disposed along the first axis, N columns of the capacitive sensors are disposed along the second axis, and each capacitive sensor is coupled to a microprocessor. Thus, when the touch panel is touched, the sensing value of the capacitive sensor located at the corresponding position is changed, and the touched position may be obtained by way of calculation. Because the structure is obviously different from the conventional touch panel, the present invention only needs one sensing layer to perform the coordinate positioning, which has to be achieved in the prior art using two sensing layers. Thus, the sensing resolution is increased, and the manufacturing cost of the printed circuit board or the indium tin oxide (ITO) glass may be further reduced as compared with the prior art.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A touch screen, comprising:
a sensor array layer, which comprises M×N capacitive sensors, wherein M rows of the capacitive sensors are disposed along a first axis, and N columns of the capacitive sensors are disposed along a second axis;
a microprocessor, which comprises a plurality of pins correspondingly coupled to the capacitive sensors, wherein when the touch screen is touched to change at least one of sensing values of the capacitive sensors in the sensor array layer, the microprocessor performs an interpolation calculation to determine a touched coordinate according to the sensing values sensed by the capacitive sensors; and M×N sensing lines respectively electrically connected to the M×N capacitive sensors and the microprocessor, wherein the microprocessor assigns corresponding M×N threshold values to the M×N capacitive sensors according to a layout resistance of each of the sensing lines, and, judges whether the $(I, J)^{th}$ capacitive sensor is touched or not according to whether the sensing value of the $(I, J)^{th}$ capacitive sensor is greater than the threshold value of the $(I, J)^{th}$ capacitive sensor, wherein the greater the layout resistance is, the lesser the threshold values assigned.

2. The touch screen according to claim 1, further comprising:
an electronic component layer; and
a grounding layer disposed between the sensor array layer and the electronic component layer.

3. The touch screen according to claim 1, further comprising:
a first silicon oxide layer; and
a second silicon oxide layer, wherein the sensor array layer is disposed between the first silicon oxide layer and the second silicon oxide layer.

4. The touch screen according to claim 1, wherein a coordinate of one of the capacitive sensors located in the $i^{th}$ row and the $j^{th}$ column is represented as $(i, j)$, wherein when the touch screen is touched to change the sensing value of the capacitive sensor located in the $i^{th}$ column and the $i^{th}$ row and the sensing value of the capacitive sensor located in the $(i+1)^{th}$ column and the $j^{th}$ row in the sensor array layer:

the microprocessor acquires the sensing value of the capacitive sensor located in the $i^{th}$ column and the $j^{th}$ row, and the sensing value of the capacitive sensor located in the $(i+1)^{th}$ column and the $j^{th}$ row, and performs the following interpolation calculation to obtain a first axial coordinate of the touched coordinate;

$$\text{the first axial coordinate} = \frac{K \times i + L \times (i+1)}{K + L} \times S$$

wherein K represents the sensing value of the capacitive sensor at the $i^{th}$ column and the $j^{th}$ row, L represents the sensing value of the capacitive sensor at the $(i+1)^{th}$ column and the $h^{th}$ row, and S represents an interval coordinate number between the capacitive sensors.

5. The touch screen according to claim 1, wherein a coordinate of one of the capacitive sensors located in the $i^{th}$ row and the $j^{th}$ column is represented as $(i, j)$, wherein when the touch screen is touched to change the sensing value of the capacitive sensor located in the $i^{th}$ column and the $j^{th}$ row, and the sensing value of the capacitive sensor located in the $i^{th}$ column and the $(j+1)^{th}$ row in the sensor array layer:

the microprocessor acquires the sensing value of the capacitive sensor located in the $i^{th}$ column and the $j^{th}$ row, and the sensing value of the capacitive sensor located in the $i^{th}$ column and the $(j+1)^{th}$ row, and performs the following interpolation calculation to obtain a second axial coordinate of the touched coordinate:

$$\text{the second axial coordinate} = \frac{K \times j + L \times (j+1)}{K + L} \times S$$

wherein K represents the sensing value of the capacitive sensor located in the $i^{th}$ column and the $j^{th}$ row, L represents the sensing value of the capacitive sensor located in the $(i+1)^{th}$ column and the $j^{th}$ row, and S represents a coordinate interval number between the capacitive sensors.

6. The touch screen according to claim 1, wherein a coordinate (x, y) of the capacitive sensor located at the $i^{th}$ column and the $j^{th}$ row is represented as $(i+N \times j, M \times i+j)$, wherein the microprocessor further performs a coordinate transferring calculation according to:

$$x0 = \frac{-x + N \times y}{M \times N - 1}$$
$$y0 = \frac{M \times x - y}{M \times N - 1}$$

wherein (x0, y0) is a transferred coordinate of the capacitive sensor.

7. A touch screen, comprising:
a sensor array layer, which comprises M×N capacitive sensors, wherein M rows of the capacitive sensors are disposed along a first axis, and N columns of the capacitive sensors are disposed along a second axis;
a microprocessor, which comprises a plurality of pins correspondingly coupled to the capacitive sensors, wherein when the touch screen is touched to change at least one of sensing values of the capacitive sensors in the sensor array layer, the microprocessor performs an interpolation calculation to determine a touched coordinate according to the sensing values sensed by the capacitive sensors; and
M×N sensing lines respectively electrically connected to the M×N capacitive sensors and the microprocessor,
wherein the microprocessor assigns corresponding M×N threshold values to the M×N capacitive sensors according to a layout resistance of each of the sensing lines, and judges whether the $(I, J)^{th}$ capacitive sensor is touched or not according to whether the sensing value of the $(I, J)^{th}$ capacitive sensor minus a base value of the $(I, J)^{th}$ capacitive sensor is greater than the threshold value of the $(I, J)^{th}$ capacitive sensor.

wherein the greater the layout resistance is, the lesser the threshold values assigned.

8. The touch screen according to claim 7, further comprising:
an electronic component layer; and
a grounding layer disposed between the sensor array layer and the electronic component layer.

9. The touch screen according to claim 7, further comprising:
a first silicon oxide layer; and
a second silicon oxide layer, wherein the sensor array layer is disposed between the first silicon oxide layer and the second silicon oxide layer.

10. The touch screen according to claim 7, wherein a coordinate of one of the capacitive sensors located in the $i^{th}$ row and the $j^{th}$ column is represented as $(i, j)$, wherein when the touch screen is touched to change the sensing value of the capacitive sensor located in the $i^{th}$ column and the $j^{th}$ row and the sensing value of the capacitive sensor located in the $(i+1)^{th}$ column and the $j^{th}$ row in the sensor array layer:

the microprocessor acquires the sensing value of the capacitive sensor located in the $i^{th}$ column and the $j^{th}$ row, and the sensing value of the capacitive sensor located in the $(i+1)^{th}$ column and the $j^{th}$ row, and performs the following interpolation calculation to obtain a first axial coordinate of the touched coordinate;

$$\text{the first axial coordinate} = \frac{K \times i + L \times (i+1)}{K+L} \times S$$

wherein K represents the sensing value of the capacitive sensor at the $i^{th}$ column and the $j^{th}$ row, L represents the sensing value of the capacitive sensor at the $(i+1)^{th}$ column and the $j^{th}$ row, and S represents an interval coordinate number between the capacitive sensors.

11. The touch screen according to claim 7, wherein a coordinate of one of the capacitive sensors located in the $i^{th}$ row and the $j^{th}$ column is represented as (i, j), wherein when the touch screen is touched to change the sensing value of the capacitive sensor located in the $i^{th}$ column and the $j^{th}$ row, and the sensing value of the capacitive sensor located in the $i^{th}$ column and the $(j+1)^{th}$ row in the sensor array layer:

the microprocessor acquires the sensing value of the capacitive sensor located in the $i^{th}$ column and the $j^{th}$ row, and the sensing value of the capacitive sensor located in the $i^{th}$ column and the $(j+1)^{th}$ row, and performs the following interpolation calculation to obtain a second axial coordinate of the touched coordinate:

$$\text{the second axial coordinate} = \frac{K \times j + L \times (j+1)}{K+L} \times S$$

wherein K represents the sensing value of the capacitive sensor located in the $i^{th}$ column and the $j^{th}$ row, L represents the sensing value of the capacitive sensor located in the $(i+1)^{th}$ column and the $j^{th}$ row, and S represents a coordinate interval number between the capacitive sensors.

12. The touch screen according to claim 7, wherein a coordinate (x, y) of the capacitive sensor located at the $i^{th}$ column and the $j^{th}$ row is represented as $(i+N\times j, M\times i+j)$, wherein the microprocessor further performs a coordinate transferring calculation according to:

$$x0 = \frac{-x + N \times y}{M \times N - 1}$$
$$y0 = \frac{M \times x - y}{M \times N - 1}$$

wherein (x0, y0) is a transferred coordinate of the capacitive sensor.

13. A coordinate positioning method, comprising:
providing a touch screen;
providing a sensor array layer, comprising M×N capacitive sensors, in the touch screen, wherein M rows of the capacitive sensors are disposed along a first axis, and N columns of the capacitive sensors are disposed along a second axis;
providing a plurality of reference coordinates, each comprising a first axial coordinate and a second axial coordinate, to the capacitive sensors;
determining, when the touch screen is touched to change at least one of sensing values of the capacitive sensors in the sensor array layer, a touched coordinate by performing an interpolation calculation according to the sensing values sensed by the capacitive sensors and the first axial coordinate and the second axial coordinate of the corresponding reference coordinate;

providing M×N sensing lines respectively electrically connected to the M×N capacitive sensors and a microprocessor;
assigning corresponding M×N threshold values to the M×N capacitive sensors according to a layout resistance of each of the sensing lines; and
judging whether the $(I, J)^{th}$ capacitive sensor is touched or not according to whether the sensing value of the $(I, J)^{th}$ capacitive sensor is greater than the threshold value of the $(I, J)^{th}$ capacitive sensor,
wherein the greater the layout resistance is, the lesser the threshold values assigned.

14. The method according to claim 13, wherein a coordinate of one of the capacitive sensors located in the $i^{th}$ row and the $j^{th}$ column is represented as (i, j), wherein when the touch screen is touched to change the sensing value of the capacitive sensor located in the $i^{th}$ column and the $j^{th}$ row and the sensing value of the capacitive sensor located in the $(i+1)^{th}$ column and the $j^{th}$ row in the sensor array layer:

the sensing value of the capacitive sensor located in the $i^{th}$ column and the $j^{th}$ row, and the sensing value of the capacitive sensor located in the $(i+1)^{th}$ column and the $j^{th}$ row are acquired, and the following interpolation calculation is performed to obtain the first axial coordinate of the touched coordinate;

$$\text{the first axial coordinate} = \frac{K \times i + L \times (i+1)}{K+L} \times S$$

wherein K represents the sensing value of the capacitive sensor at the $i^{th}$ column and the $j^{th}$ row, L represents the sensing value of the capacitive sensor at the $(i+1)^{th}$ column and the $j^{th}$ row, and S represents a coordinate interval number between the capacitive sensors.

15. The method according to claim 13, wherein a coordinate of one of the capacitive sensors located in the $i^{th}$ row and the $j^{th}$ column is represented as (i, j), wherein when the touch screen is touched to change the sensing value of the capacitive sensor located in the $i^{th}$ column and the $j^{th}$ row, and the sensing value of the capacitive sensor located in the $i^{th}$ column and the $(j+1)^{th}$ row in the sensor array layer:

the sensing value of the capacitive sensor located in the $i^{th}$ column and the $j^{th}$ row, and the sensing value of the capacitive sensor located in the $i^{th}$ column and the $(j+1)^{th}$ row are acquired, and the following interpolation calculation is performed to obtain the second axial coordinate of the touched coordinate:

$$\text{the second axial coordinate} = \frac{K \times j + L \times (j+1)}{K+L} \times S$$

wherein K represents the sensing value of the capacitive sensor at the $i^{th}$ column and the $j^{th}$ row, L represents the sensing value of the capacitive sensor at the $(i+1)^{th}$ column and the $j^{th}$ row, and S represents a coordinate interval number between the capacitive sensors.

16. The method according to claim 13, wherein a coordinate (x, y) of the capacitive sensor located at the $i^{th}$ column and the $j^{th}$ row is represented as $(i+N\times j, M\times i+j)$, wherein the method further comprises:
performing a coordinate transferring calculation according to:

$$x0 = \frac{-x + N \times y}{M \times N - 1}$$

$$y0 = \frac{M \times x - y}{M \times N - 1}$$

wherein (x0, y0) is a transferred coordinate of the capacitive sensor.

17. A coordinate positioning method, comprising:
providing a touch screen;
providing a sensor array layer, comprising M×N capacitive sensors, in the touch screen, wherein M rows of the capacitive sensors are disposed along a first axis, and N columns of the capacitive sensors are disposed along a second axis;
providing a plurality of reference coordinates, each comprising a first axial coordinate and a second axial coordinate, to the capacitive sensors;
determining, when the touch screen is touched to change at least one of sensing values of the capacitive sensors in the sensor array layer, a touched coordinate by performing an interpolation calculation according to the sensing values sensed by the capacitive sensors and the first axial coordinate and the second axial coordinate of the corresponding reference coordinate;
providing M×N sensing lines respectively electrically connected to the M×N capacitive sensors and a microprocessor;
assigning corresponding M×N threshold values to the M×N capacitive sensors according to a layout resistance of each of the sensing lines; and
judging whether the (I, J)$^{th}$ capacitive sensor is touched or not according to whether the sensing value of the (I, J)$^{th}$ capacitive sensor minus a base value of the (I, J)$^{th}$ capacitive sensor is greater than the threshold value of the (I, J)$^{th}$ capacitive sensor,
wherein the greater the layout resistance is, the lesser the threshold values assigned.

18. The method according to claim 13, wherein a coordinate of one of the capacitive sensors located in the i$^{th}$ row and the j$^{th}$ column is represented as (i, j), wherein when the touch screen is touched to change the sensing value of the capacitive sensor located in the i$^{th}$ column and the j$^{th}$ row and the sensing value of the capacitive sensor located in the (i+1)$^{th}$ column and the j$^{th}$ row in the sensor array layer:
the sensing value of the capacitive sensor located in the i$^{th}$ column and the j$^{th}$ row, and the sensing value of the capacitive sensor located in the (i+1)$^{th}$ column and the j$^{th}$ row are acquired, and the following interpolation calculation is performed to obtain the first axial coordinate of the touched coordinate;

$$\text{the first axial coordinate} = \frac{K \times i + L \times (i+1)}{K + L} \times S$$

wherein K represents the sensing value of the capacitive sensor at the i$^{th}$ column and the j$^{th}$ row, L represents the sensing value of the capacitive sensor at the (i+1)$^{th}$ column and the j$^{th}$ row, and S represents a coordinate interval number between the capacitive sensors.

19. The method according to claim 13, wherein a coordinate of one of the capacitive sensors located in the i$^{th}$ row and the j$^{th}$ column is represented as (i, j), wherein when the touch screen is touched to change the sensing value of the capacitive sensor located in the i$^{th}$ column and the j$^{th}$ row, and the sensing value of the capacitive sensor located in the i$^{th}$ column and the (j+1)$^{th}$ row in the sensor array layer:
the sensing value of the capacitive sensor located in the i$^{th}$ column and the j$^{th}$ row, and the sensing value of the capacitive sensor located in the i$^{th}$ column and the (j+1)$^{th}$ row are acquired, and the following interpolation calculation is performed to obtain the second axial coordinate of the touched coordinate:

$$\text{the second axial coordinate} = \frac{K \times j + L \times (j+1)}{K + L} \times S$$

wherein K represents the sensing value of the capacitive sensor at the i$^{th}$ column and the j$^{th}$ row, L represents the sensing value of the capacitive sensor at the (i+1)$^{th}$ column and the j$^{th}$ row, and S represents a coordinate interval number between the capacitive sensors.

20. The method according to claim 13, wherein a coordinate (x, y) of the capacitive sensor located at the i$^{th}$ column and the j$^{th}$ row is represented as (i+N×j, M×i+j), wherein the method further comprises:
performing a coordinate transferring calculation according to:

$$x0 = \frac{-x + N \times y}{M \times N - 1}$$

$$y0 = \frac{M \times x - y}{M \times N - 1}$$

wherein (x0, y0) is a transferred coordinate of the capacitive sensor.

* * * * *